United States Patent Office 3,480,335
Patented Nov. 25, 1969

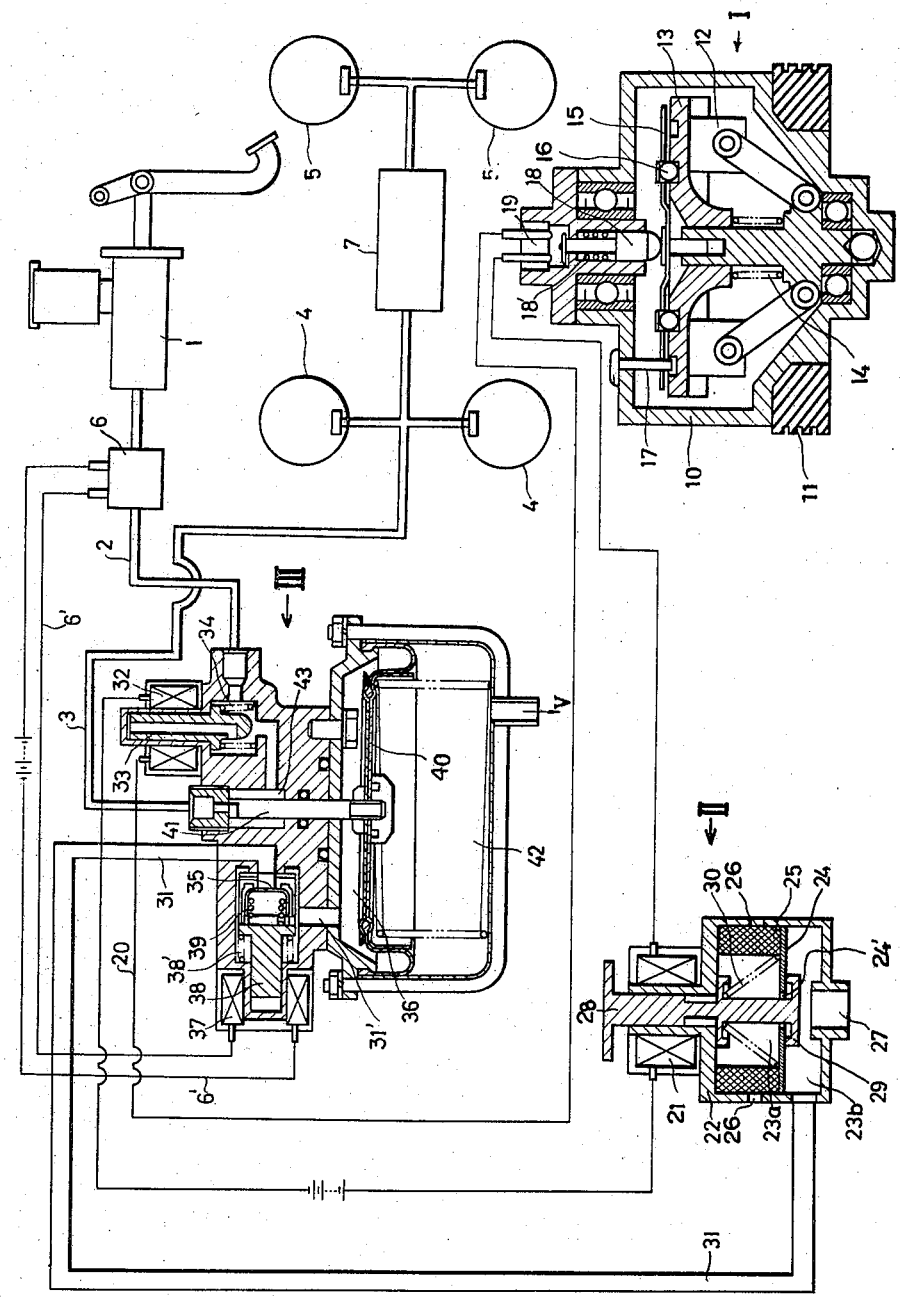
Fig. I.

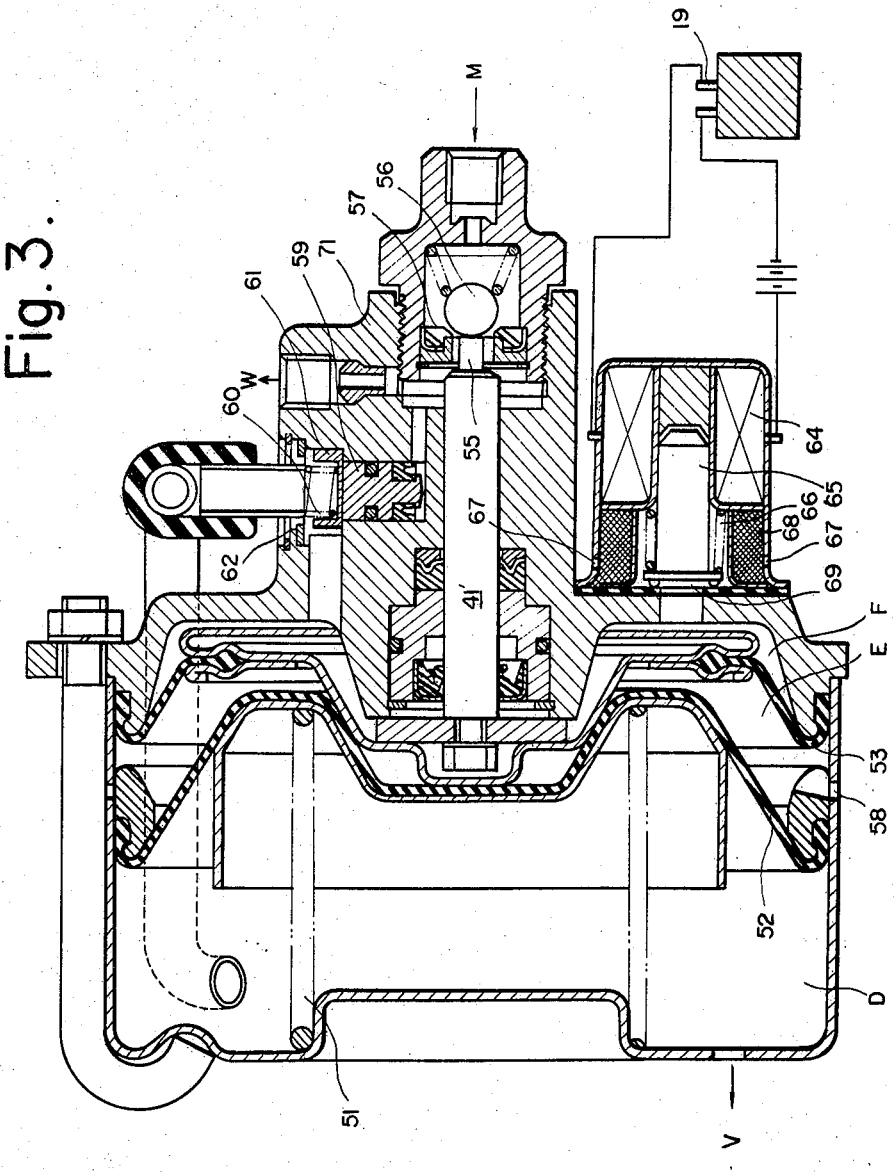

3,480,335
ANTI-SKID BRAKE APPARATUS
FOR A VEHICLE
Masami Inada, Kariya, Japan, assignor to Aisin Seiki
Kabushiki Kaisha, Kariya, Aichi Prefecture, Japan
Filed July 3, 1967, Ser. No. 650,878
Claims priority, application Japan, July 5, 1966,
41/43,983
Int. Cl. B60t 8/06
U.S. Cl. 303—21                              2 Claims

ABSTRACT OF THE DISCLOSURE

Anti-skid brake apparatus for vehicles, particularly for automotive vehicles, comprising a skid detector for producing and sending a signal responsive to reduction of number of r.p.m. of the wheel to the critical value just before resulting in locking of the running wheel, and a device for reducing the brake oil pressure according to said signal from the skid detector.

---

It is an object of the present invention to provide a brake apapratus of the above character, which is adapted for stabilized and safety braking effect even in case of emergency brake, avoiding any uncomfortable braking efforts.

It is another object of the present invention to provide an improved brake apparatus, which is reliable in operation and is relatively inexpensive of manufacture.

Other objects will become apparent from the following description of the embodiments of this invention taken in connection with the accompanying drawings in which:

FIGURE 1 shows schematically a brake apparatus forming an embodiment of this invention, including a skid detector, an air control valve device, and a brake oil pressure reducing device, shown in section, all of which devices being connected through the brake oil pipes and controlling electric circuits;

FIGURE 3 is a modified form of the brake oil pressure reducing device included in the brake apparatus of FIGURE 1.

Figure 2A:
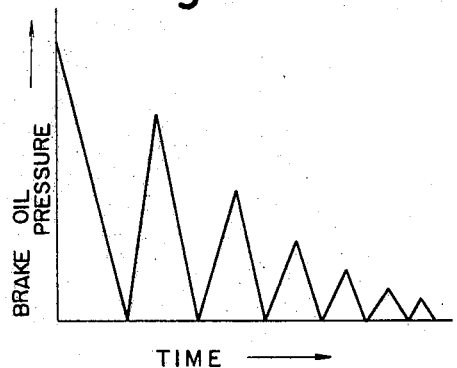
FIGURES 2A, 2B and 2C are graphs showing the actual and ideal braking efforts.

In anti-skid brake systems for vehicles heretofore proposed, decelerated rotation of the wheel is subject to fluctuation between the highest point and zero point, resulting in long brake distance as shown in FIGURE 2A, and unavoidably caused knocking vibration of the vehicle, so that uncomfortable effect will have to be given to the driver and passengers, and moreover this would give any undesirable influence to the vehicle. Especially in case of emergency braking, it will result in producing dangerous skidding of the wheels. It is the principal object of the present invention to avoid such undesirable braking effect.

Figure 2B:
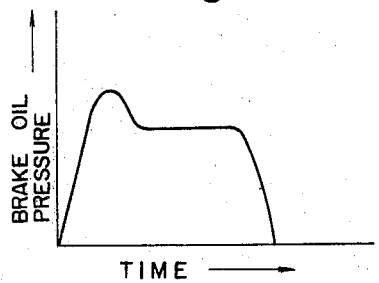
Figure 2C:
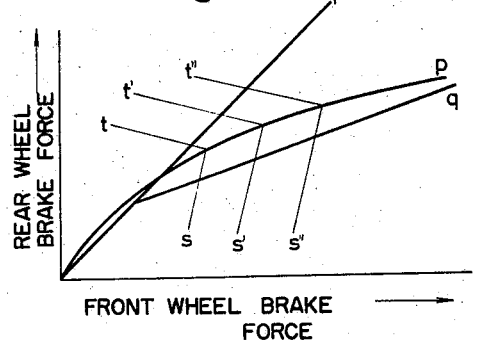

FIGURE 2B shows the characteristic curve obtained by the use of the brake apparatus according to this invention. In FIG. 2C, line $p$ shows the ideal brake force distribution, and if this brake force is distributed for the front and the rear wheels, locking of all front and rear wheels would be effected simultaneously. Usually, the brake force is so determined that locking of the rear wheels may not occur earlier than that of the front wheels, so that the modified brake force will be as shown by line $q$. Lines S, S' and S" show the critical point of lock of the front wheels, with variation of the adhesion coefficient of the tire and road surface taken into consideration. In such brake apparatus, if there is provided a front wheel lock detector and the brake oil pressure from the master cylinder is reduced, the locking of the front and rear wheels would be prevented and, if such reduced brake oil pressure is maintained at the critical degree just below the point of producing locking of the wheel, it would be possible to obtain the maximum braking effect under predetermined road condition.

FIGURE 2B is a graph of brake pressure obtained in the above mentioned manner. In the brake oil circuit wherein same brake pressure is applied for the front and rear wheels without using any control valve, the brake pressure takes line $r$ of FIG. 2C and, in the zone passed over line $p$, locking of the rear wheel will be produced earlier. Lines $t$, $t'$ and $t''$ show the limit of locking of the rear wheels, taking the variation of adhesion coefficient of tire and road into consideration. In such brake circuit, it is preferable to provide a lock detector with respect to the rear wheels, thereby controlling the brake pressure reducing device, and it would be possible to prevent any locking of all front and rear wheels.

Now referring to FIGURE 1, the reference numeral 1 designates a master brake cylinder, 2 is a brake oil pipe or hose leading to a device generally shown as III to be described hereinafter, and 3 is a brake oil pipe connecting said device III with the front and rear wheel cylinders 4 and 5. 6 is a pressure switch inserted into the oil pipe 2 and adapted to open an electric circuit 6' when acted upon by the oil pressure from the master cylinder 1. 7 is a conventional control valve inserted into the brake oil pipe 3 between the front wheel brake cylinders 4 and the rear wheel brake cylinders 5.

As shown generally at I, a skid detector assembly comprises a casing 10 adapted to be rotated in unison with a tire 11 and containing therein a rotatable governor 12 supported by a ball bearing. A disc 13 connected to the governor 12 is normally biassed outwardly by a spring 14, and a cam plate 15 supported by balls 16 is so connected to a guide pin 17 that it may slightly be oscillated relative to the casing 10 in the direction of rotation. The lower end of a rod 18 is abutting against the central portion of the cam plate 15, and its head is formed as a movable contact adapted to co-operate with the contacts of an electric switch 19, said parts being so arranged that when the r.p.m. of the running wheel is decreased at predetermined degree upon application of brake, the governor 12 is erected and the rod 18 is moved outwardly, whereby actuating the switch 19 to close the circuit 20 including a solenoid 21 of a brake pressure reducing device generally shown at III, so that a signal is sent thereto. When r.p.m. of the running wheel is increased, the governor 12 will be expanded, and the disc 13 will be moved inwardly against the action of the spring 14 and the rod 18 will be retracted inwardly by the action of the spring 18' as shown in the drawing, so that the circuit 20 will be opened.

An air control valve device, shown generally at II, comprises a solenoid 21 connected in the circuit 20 and controlled by said switch 19 in the skid detector I, and a casing 22 which is divided into two chambers 23a and 23b by a partition 24 having an opening 24'. The first chamber 23a is provided with an air cleaner 25 open to the atmosphere through openings 26. The bottom of the chamber 23b has a vacuum port 27 connected to a vacuum source. A valve stem 28 of the valve 29 is normally biassed upwardly by means of a spring 30 and is adapted to be moved downwardly by energization of said solenoid 21. In the position shown, the valve 29 closes the opening 24' and the vacuum port 27 is opened into the second chamber 23b which is in communication with a pipe 31 of the brake pressure reducing device III. When the solenoid 21 is energized, the valve 29 will close the vacuum port 27, whereas the opening 24' is opened to make communication between the first chamber 23a and the second chamber 23b.

The brake pressure reducing device shown generally at III, FIG. 1, consists of three control organs, i.e. oil pressure stop valve device, air stop valve device and air regulator device. With respect to the oil pressure stop valve device, a solenoid 32 is connected in the circuit 20 controlled by the switch 19 in the skid detector I. When said solenoid 32 is energized by closing the switch 19, a plunger valve body 33 is pulled down thereby, so that it will shut off the communication between the master cylinder oil pipe 2 and the wheel cylinder oil pipe 3. When said switch 19 is opened deenergizing the solenoid 32, said plunger valve body 33 is lifted as biassed by a spring 34, thereby establishing the communication between the master cylinder oil pipe 2 and the wheel cylinder oil pipe 3. With respect to the air stop valve device, there is provided a non-return valve 35 in the passage connecting the air pipe 31 coming from said vacuum chamber 23b of the air control valve device II with an air pressure regulator chamber 36 through a passage 31'. A solenoid 37 is provided in the circuit 6' controlled by the pressure switch 6, and a piston 38 controlled by said solenoid 37 is connected to the non-return valve 35 which is normally biassed toward open position by means of a spring 39. Said valve 35 is held closed when the solenoid 37 is deenergized. When the switch 19 is closed and the air control valve device II is actuated and the air pressure in the pipe 31 is increased due to breaking of the vacuum in the vacuum chamber 23b, said non-return valve 35 will be opened, whereby air pressure in the chamber 36 will be increased. A diaphragm 40 having a stem 41 and forming a movable partition between said chamber 36 and a chamber 42 will be pressed down. 43 is a connecting chamber connecting the oil pipes 2 and 3, and the upper end of said stem 41 of the diaphragm 40 is protruding into said connecting chamber 43. It will be seen that according to the downward movement of the stem 41 the volume of said connecting chamber 43 will be increased. In the drawing, V is a port connecting the chamber 42 with a source of vacuum.

The operation of the present invention will be described as follows: At the normal braking without causing any tendency of locking of the wheels, the oil pressure produced in the master cylinder 1 is passed through the pipe line 2 and will actuate the pressure switch 6, which switch being so arranged that the controlling electrical circuit is cut off when actuated by oil pressure. Said oil pressure is introduced into the connecting chamber 43 of the brake pressure reducing device III. After actuating the front wheel cylinders 4—4, the oil pressure passing through the control valve 7 will reach the rear cylinders 5—5. The skid detecting device I is rotating together with the running wheel 11, the pin 17, the cam plate 15, the balls 16, the disc 13 and the governor 12. During rotation of the governor 12, the disc 13 is pushed down against the action of the spring 14, so that switch 19 is in its off position. Now, when any wheel equipped with the skid detector is subjected to locking, it results in rapid drop of its angular speed and the rotation of the governor 12 will be stopped, thereby the disc 13 will be lifted, and furthermore the cam plate 15 will be raised by the balls 16, so that the switch 19 will be closed by the action of the lifting rod 18. Thus, upon completion of the electrical circuit, the solenoid 21 of the air control valve device II (FIG. 2) will be put into operation, whereby the rod 28 is pushed down against the action of the spring 30, so that atmospheric air is introduced into the chamber 23b through the air cleaner 25 and the openings 26 and, at the same time, the vacuum port 27 leading to the chamber 23b will be shut off. The piston 38 is pushed to the right by the action of the spring 38' and the pressure switch 6 is opened, whereby the comunication of the passages 31 and 35 is shut off. With respect to the piston 38, the non-return valve 35 is biassed toward the right by means of the springs 39. When air is passed through the passage 31, the valve 35 is opened and air is passed into the passage 31'. The rod 41 is pressed down by the pressure difference between the chamber 36 and the chamber 42 which is normally maintained under vacuum, so that the volume of the chamber 43 will be increased, and the pressure for the brakes 4 and 5 will be decreased. When the solenoid 32 is operated according to the action of the switch 19, the plunger valve 33 is pressed against the action of the spring 34, thereby shutting off the space 41 from the space 43. Under release of locking by decrease of braking pressure, the governor 12 will be rotated and, at the same time, the switch 19 returns to the off position. The rod 28 of the air control valve is returned to the normal position by the action of the spring 30, whereby the chamber 23b will be communicated with the source of vacuum. The non-return valve 35 of the air stop valve shown in FIG. 1 remains closed and the chamber 36 will be filled with gas. The solenoid 32 is put into the inoperative position as soon as the switch 19 is turned to the off position. Such condition is continued until stop of the wheel, as long as the pressure of the master cylinder is not decreased. Upon releasing pressure on the master cylinder when the running vehicle is stopped, or when any braking action becomes unnecessary, the valve 33 is returned to its initial position and, at the same time, the piston 38 is returned by means of the solenoid 37 energized by pressure switch 6, whereby the chamber 36 communicates with vacuum, all parts returning to their initial positions.

FIGURE 3 shows a modified form of the brake pressure reducing device III of FIGURE 1, wherein it is assumed that the vehicle engine is stopped and the brake is not applied. By the action of a spring 51, the diaphragms 52 and 53 are pressed rightwardly and, at the same time, a plunger 41' is also pressed rightwardly, so that a ball 56 pressed thereby is in the position released from a valve seat 57, and the master cylinder oil pipe 2 and the wheel cylinder oil pipe 3 are in communication.

Now, assuming that the vehicle engine is put into operation, whereas brake is not applied, among the air chambers D, E and F divided by said diaphragm, the chamber F is under vacuum and the chamber E is under atmospheric air pressure supplied through an opening 58, so that the diaphragm 52 will be pressed leftwardly by the difference of air pressure in the chambers D and E, and the diaphragm 53 is moved rightwardly due to the difference of air pressure in the chambers E and F.

Assuming that the vehicle engine is operated and the normal brake is applied without producing any skid of the tire, a piston 59 actuated by the brake oil pressure moves a valve body 61 toward a valve seat 62 against the action of a spring 60, thereby shutting off the communication between the chambers D and E.

With the vehicle engine operated, when a harder brake is applied producing tire skid, the skid detector I is operated to energize a solenoid 64, whereby a plunger 65 will be moved rightwardly against the action of a spring 66, so that air is introduced into the chamber F, atmospheric air passing through openings 67, air cleaner 68 and the opened valve 69 formed at the left-hand end of the plunger 65. As a result, the degree of vacuum in the chamber F will be decreased, and the plunger 41' will be pushed leftwardly by the action of oil pressure, and the ball 56 will be seated on the valve seat 57. Upon further leftward movement of the plunger 41', the volume of an oil chamber 71 is increased and wheel cylinder brake oil pressure will be decreased. Upon release of the skid of the tire due to decrease of the wheel cylinder oil pressure, the solenoid 64 will be de-energized, thereby the plunger 65 will be moved leftwardly, stopping the introduction of air, so that the wheel cylinder brake oil pressure will be maintained at the degree when the skid of tire has been released. In FIG. 3, M, W and V indicate the ports connected to the master cylinder oil pipe, the wheel cylinder oil pipe, and the source of vacuum, respectively.

From the foregoing it will be understood that, according to the present invention, upon applying strong brake for emergency purpose the apparatus picks up the critical maximum value of the brake pressure just before producing any locking of the wheel, and then the brake pressure is reduced to and maintained at predetermined degree, thereby avoiding undesirable locking of the wheel and attaining normal stopping of the vehicle according to the ideal brake curve, so that it would be possible to expect smoother brake stability, and to avoid any uncomfortable vibration of the vehicle, even at the time of emergency brake. Moreover, the apparatus according to this invention is relatively simple in construction and reliable in operation.

What I claim is:

1. An anti-skid brake apparatus for vehicles comprising a master cylinder, wheel cylinders, a brake fluid pipe connecting the master cylinder and the wheel cylinders, a skid detector for detecting the tendency of the running wheel to lock during emergency braking and for producing an electrical signal upon detection of said tendency, a control valve device electrically coupled to said skid detector and actuated upon receiving a signal from the skid detector, said control valve device being coupled to a source of vacuum when in the non-actuated position and to atmosphere when in the actuated position, a servo means having a variable pressure chamber and a constant pressure chamber coupled to a source of vacuum and a diaphragm dividing said chambers, said servo means being connected to said control valve device and being controlled thereby and being connected in said brake fluid pipe for shutting off or restricting the communication between said master cylinder and the wheel cylinders and for increasing the volume of the space leading to the wheel cylinders, a non-return valve connected between said control device and said servo means, and resetting means coupled to said non-return valve and said master cylinder for opening said non-return valve when said master cylinder exerts no braking pressure, whereby said control valve device allows air to flow to said servo means to increase the volume of said variable pressure chamber when said control valve device is actuated in order to increase the volume of said variable pressure chamber, and connects the variable pressure chamber to vacuum when said control valve device is not actuated and said resetting means opens said non-return valve.

2. An anti-skid brake apparatus as claimed in claim 1, wherein the skid detector device includes means responsive to a reduction in the number of r.p.m.'s of a running vehicle wheel for producing and sending the electrical signal, and said servo means includes brake fluid valve means connected in the brake fluid pipe between the master cylinder brake oil passage and the wheel cylinder brake oil passages for restricting or shutting off the brake fluid pipe and said servo means further comprising means for increasing the volume of the portion of the brake fluid passage leading to the wheel cylinders in response to said signal from said skid detector and means for maintaining said increased volume condition during the remaining period of braking.

References Cited
UNITED STATES PATENTS

| | | |
|---|---|---|
| 2,868,338 | 1/1959 | Lucien et al. |
| 2,874,810 | 2/1959 | Brown. |
| 2,963,328 | 12/1960 | Lucien. |
| 3,203,516 | 8/1965 | Stelzer. |

DUANE R. REGER, Primary Eaxminer

U.S. Cl. X.R.

188—181